United States Patent [19]

Murakami et al.

[11] Patent Number: 4,531,158
[45] Date of Patent: Jul. 23, 1985

[54] AUTOMATIC FOCUSING SYSTEM FOR VIDEO CAMERAS

[75] Inventors: Toshio Murakami; Kentaro Hanma, both of Yokohama, Japan

[73] Assignee: Hitachi, Ltd., Tokyo, Japan

[21] Appl. No.: 460,664

[22] Filed: Jan. 24, 1983

[30] Foreign Application Priority Data

Jan. 27, 1982 [JP] Japan ................................. 57-9997
Jun. 9, 1982 [JP] Japan ................................. 57-97632

[51] Int. Cl.$^3$ ............................................. H04N 3/26
[52] U.S. Cl. ................................................ 358/227
[58] Field of Search ....................... 358/227, 225, 226

[56] References Cited

U.S. PATENT DOCUMENTS 4,320,417 3/1982 Hanma ................................. 358/227
4,414,575 11/1983 Yamamoto ........................... 358/227
4,422,097 12/1983 Inuiya .................................. 358/227

*Primary Examiner*—Michael A. Masinick
*Attorney, Agent, or Firm*—Antonelli, Terry & Wands

[57] ABSTRACT

An automatic focusing system for a video camera carries out automatic focusing on the basis of a focus signal extracted from a high-frequency component of a video signal. The automatic focusing system comprises at least one of picture-contents change detecting means for detecting a change, if any, between the contents of pictures of two consecutive picture periods on the basis of the output signal of a low-pass filter to which the video signal is applied, momentary change detecting means for detecting an abrupt change of the focus signal, and reduction-factor change detecting means for detecting a change between the contents of pictures of two consecutive picture periods on the basis of the output signal of a detector detecting the reduction factor of the lens system, so that the automatic focusing operation can be interrupted in response to the output signal of the change detecting means and can be restarted when the output signal is reduced to a level lower than a predetermined level.

16 Claims, 14 Drawing Figures

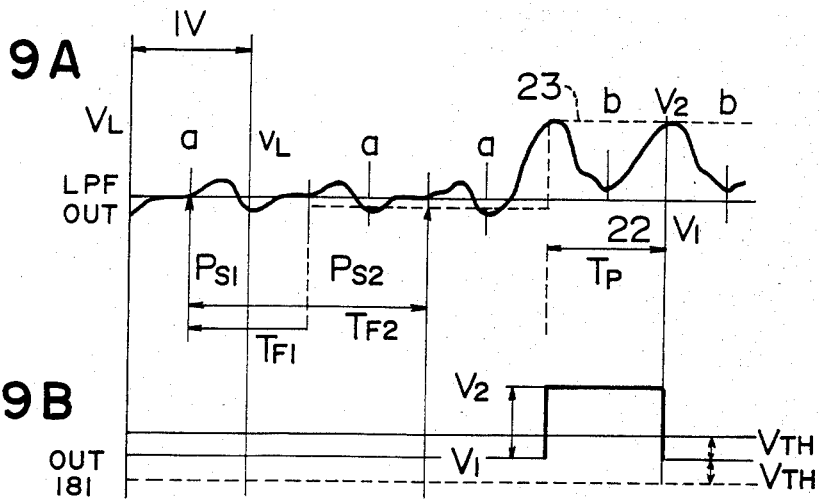
FIG. 9A
FIG. 9B
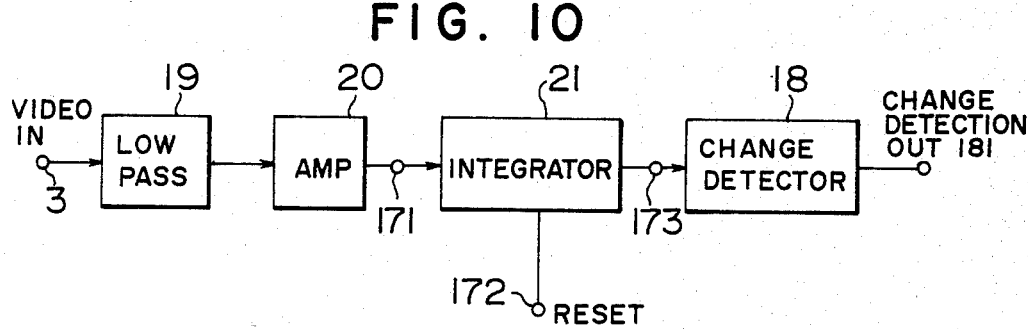
FIG. 10
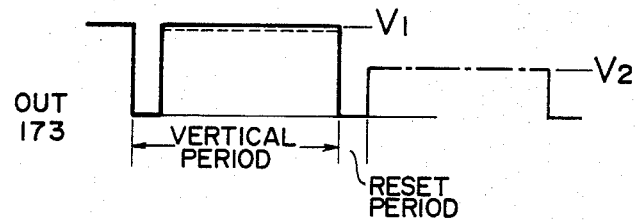
FIG. 11

AUTOMATIC FOCUSING SYSTEM FOR VIDEO CAMERAS

This invention relates to an automatic focusing system for video cameras, and more particularly to such an automatic focusing system which includes means for preventing the adverse effect of an abrupt and great change between scenes being photographed.

As one of prior art automatic focusing systems for video cameras, the one based upon the so-called climbing control is known in which a high-frequency component of a video signal is extracted to detect the definition of a picture, and rotation of a focusing ring (referred to hereinafter as a helicoid) in a lens system is so controlled that the definition of the picture becomes maximum or sharpest. This system is described in detail in NHK Technical Research Report, 1965, Vol. 17, No. 1, page 21 under the title of "Automatic Focusing System for Television Camera Based upon Climbing Servo System" by Ishida et al and also in U.S. Pat. No. 4,320,417 issued Mar. 16, 1982 and owned by the present assignee. The disclosed system will now be described briefly with reference to FIGS. 1 and 2.

FIG. 1 is a block diagram showing the structure of the automatic focusing system based upon the climbing servo system. Referring to FIG. 1, the automatic focusing system includes a lens system 1, a TV camera circuit 2, a video signal output terminal 3, a high-pass filter (HPF) 4, a detector 5 generating a focus voltage signal, a difference hold circuit 6 having both of the function of a difference circuit and the function of a sample and hold circuit, a motor control circuit 7, a motor 8 causing rotation of the helicoid in the lens system 1, a reduction factor (F) detector 31, a zoom factor (focal distance: f) detector 32, and a lens range computing circuit 33. In FIG. 1, the numeral 9 designates a step-by-step control (climbing) circuit block including the high-pass filter 4, focus voltage detector 5 and difference hold circuit 6 above described.

The operation of the automatic focusing system shown in FIG. 1 will be described with reference to a characteristic diagram shown in FIG. 2.

Light from an object is incident upon the lens system 1 to be converted into an electrical signal by the camera circuit 2, and such a video signal appears at the video signal output terminal 3. A high-frequency component of the video signal is selectively extracted by the high-pass filter 4 and is then detected by the focus voltage detector 5, and the resultant voltage appears at a terminal 51. It is to be noted herein that the voltage (referred to hereinafter as a focus voltage) appearing at the terminal 51 and corresponding to the extracted high-frequency component of the video signal is indicative of the definition of the picture, and, therefore, as shown in FIG. 2, the focus voltage is maximum when the helicoid in the lens system 1 is situated at a position A at which the helicoid position is in accord with the distance from the camera to the object, while the focus voltage decreases as the helicoid in the lens system 1 is moved away from the position A. Thus, as seen in FIG. 2, the focus voltage shows a hill-like characteristic such that it becomes maximum when the helicoid is brought to the focus position while it is moved in a direction of from the position corresponding to a focus point very close to the camera toward the position corresponding to an infinitely remote focus point or in a direction of from the position corresponding to an infinitely remote focus point toward the position corresponding to a focus point very close to the camera.

It can be seen from FIG. 2 that the desired automatic focusing can be achieved by controlling the position of the helicoid in the lens system 1 by some suitable means so that the helicoid is always brought to the position at which the focus voltage output appearing at the terminal 51 becomes maximum. Such means is provided by the combination of the difference hold circuit 6, motor drive circuit 7 and motor 8 shown in FIG. 1. Referring to FIG. 1, the difference hold circuit 6 samples and holds at predetermined time intervals the focus voltage appearing at the terminal 51 as shown in FIG. 2 and compares the value now sampled and held with the value sampled and held in, for example the preceding vertical period. The difference hold circuit 6 generates a positive voltage when the focus voltage is increasing relative to time and the difference is positive, while it generates a negative voltage when the focus voltage is decreasing relative time and the difference is negative. When the output voltage of the difference hold circuit 6 appearing at the terminal 61 is positive, the motor drive circuit 7 drives the motor 8 in the normal direction thereby moving the helicoid position in the forward direction, while when the above output voltage is negative, the motor drive circuit 7 drives the motor 8 in the opposite or reverse direction thereby moving the helicoid position in the reverse direction.

Although FIG. 2 illustrates the output voltage of the difference hold circuit 6 in the case in which the helicoid is rotated to be moved from the position corresponding to a focus point very close to the camera toward the position corresponding to an infinitely remote focus point, it will be readily understood that the waveform of the output voltage is similar but inverse to that illustrated in the case in which the helicoid is rotated to be moved from the position corresponding to an infinitely remote focus point toward the position corresponding to a focus point very close to the camera.

By virtue of the above operation, the derived automatic focusing can be achieved as the helicoid position control loop controls the position of the helicoid driven by the motor 8 so that the output voltage of the difference hold circuit 6 varies in a direction of climbing the hill of the focus voltage curve until finally it is stabilized while oscillating with small amplitudes at the position corresponding to the apex of this hill.

The zoom factor (focal distance: f) detector 32, the reduction factor detector 31 and the lens range computing circuit 33 in FIG. 1 are provided to ensure focusing on an object within a predetermined range, for example, a range of from a point spaced apart by a distance of 1.5 m only from the camera to an infinitely remote point ($\infty$). The prior art teaches that the required movable range of the lens system 1 differs depending on the focal distance f and reduction factor F of the lens system 1. The lower the zoom magnification of the lens system 1 and the larger the reduction factor of the lens system 1, the larger is the depth of field. In such a case, therefore, the above range may be narrow. The higher the zoom magnification of the lens system 1 and the smaller the reduction factor, the above range becomes wider. The above fact is utilized so as to shorten the length of time required for the focusing operation of the automatic focusing system and also to previously prevent an undesirable increase in the probability of out-of-focusing due to mal-operation or the like thereby ensuring satisfactorily reliable focusing.

The feature of the prior art automatic focusing system for a video camera based upon climbing control will be understood from the above description.

Although the prior art system above described exhibits a performance sufficient for achieving the function of automatic focusing, it has a drawback which will be described now.

When an object being photographed moves suddenly out of focus, when the video camera is panned, when the camera vibrates as it is not held firmly by the hand or when the area directly in front of the lens system 1 is covered for a moment, a great change occurs in the contents of the video signal, resulting in an abnormal variation of the focus voltage derived from the video signal. Consequently, a focus voltage characteristic waveform as shown by a typical hill-like waveform in FIG. 2 can not be obtained. This is undesirable in that failure of accurate step-by-step (climbing) control results in an excessive degree of out-of-focusing, and unnecessary movement of the lens system 1 continues until accurate focusing is attained. In this specification, such a great change in the contents of the video signal will be referred to hereinafter as an object change. It has been confirmed that there is not any substantial variation in the focus voltage when the object moves in a steady manner. That is, it is known that the automatic focusing operation can follow the movement of a moving object relatively satisfactorily.

It is therefore a primary object of the present invention to provide an improved automatic focusing system for a video camera, in which means are provided for further reducing the possibility of failure of accurate step-by-step (climbing) control due to an object change.

Another object of the present invention is to provide an improved automatic focusing system for a video camera, which includes an object change detection circuit of simple structure which can detect with better fidelity an object change occurring in a video signal of an object.

According to the present invention which attains the above objects, at least one of a signal indicative of a change of the level of a signal provided by passing a video signal of an object through a low-pass filter having a low cut-off frequency of, for example, 30 Hz to 100 Hz, a signal indicative of a change of the output voltage of a reduction factor detector used for computing the movable range of a lens system, and a signal indicative of a momentary abrupt change of the focus voltage (zero focus voltage experienced during the step-by-step control operation) occurring only when the object picture taking condition changes, is detected as a signal indicative of the object change, and the signal so detected is utilized for controlling the interruption and/or re-starting of the control of the lens system according to the climbing mode.

According to one aspect of the present invention, the automatic focusing system comprises means for providing a focus signal on the basis of a video signal of an object photographed by a video camera, lens-system position control means including a motor for controlling the position of a lens system on the basis of the focus signal thereby achieving focusing, object change detecting means for detecting an object change on the basis of the video signal, motor drive inhibiting means and/or motor re-starting means, the object change detecting means including a low-pass filter having a cut-off frequency lower than the cut-off frequency of the lens system in terms of the equivalent low-pass filter characteristic of the lens system when the lens system is brought to the most out-of-focus position and generating a signal indicative of an object change when the object change is detected due to a change of the level of the signal provided by sequentially passing the video signal through the low-pass filter. The detected object change signal is used as follows: (a) when the object change signal is detected during the step-by-step control operation the control operation is continued during the presence of the detected object change signal and the operation of the lens system is re-started as soon as the object change disappears, that is, the detected signal is stable. With such a function even if the focus voltage abnormally varies in response to the change of the object and consequently the lens system stops at an out-of-focus position due to an erroneous determination of object change, a normal step-by-step operation of the lens system is recovered by the restart operation. (b) When the lens system is quiescent at a focus position for waiting or motor stopping, the operation of the lens system is re-started as soon as the object change signal detected depending upon the change of the object is stabilized (disappears), thus permitting the usual control according to the climbing mode. Such a re-start operation prevents the lens system from being stopped at the out-of-focus position erroneously due to the change of the object. (c) The operation of the lens system is stopped by motor stopping whenever the object change signal is generated, while it is restarted as soon as the object change signal disappears, so that an excessive degree of out-of-focusing and unnecessary movement of the lens system can be prevented during an object change.

According to another aspect of the present invention, the output signal from a reduction factor detector is applied as an input to the object change detecting means to obtain the object change indication signal above described. This aspect is based on the following fact. In the object picture taking condition in which the stop is operating, an object change results in a corresponding certain change of the output voltage of the reduction factor detector. This is because the reduction factor of the stop of the lens system is automatically controlled on the basis of the voltage obtained by detecting the video signal by the voltage detector. Therefore, an object change results in a change of the stop control voltage, and the resultant change in the reduction factor results in a corresponding change of the output voltage of the reduction factor detector. Thus, when the object change disappears, the reduction factor indication voltage is also stabilized.

According to still another aspect of the present invention, the object change detecting means includes a focus-voltage abrupt change detector such as a differentiator which detects that the focus voltage drops momentarily to zero when, for example, another body crosses the area directly in front of the camera or the front face of the lens system is momentarily covered.

The rate of providing pictures of high quality by virtue of the automatic focusing control can be further improved by combining the various aspects of the object change detecting means above described and utilizing the combination for the interruption and re-starting of the step-by-step control by the automatic focusing motor.

Preferred embodiments of the present invention will be described in detail with reference to the drawings.

FIGS. 9A and 9B are waveform diagrams illustrating the operation of the circuit shown in FIG. 8.

FIG. 10 is a block diagram showing the structure of another embodiment of the present invention.

FIG. 11 is a waveform diagram illustrating the oepration of the embodiment of the present invention shown in FIG. 10.

For a better understanding of the present invention, an automatic focusing system which includes object change detecting means based upon counting of the number of contours and which is proposed in Japanese Patent Application No. 93870/81 filed June 19, 1981 and assigned to the present assignee will be described with reference to FIGS. 3 to 5, before describing preferred embodiments of the present invention in detail.

Figure 1:
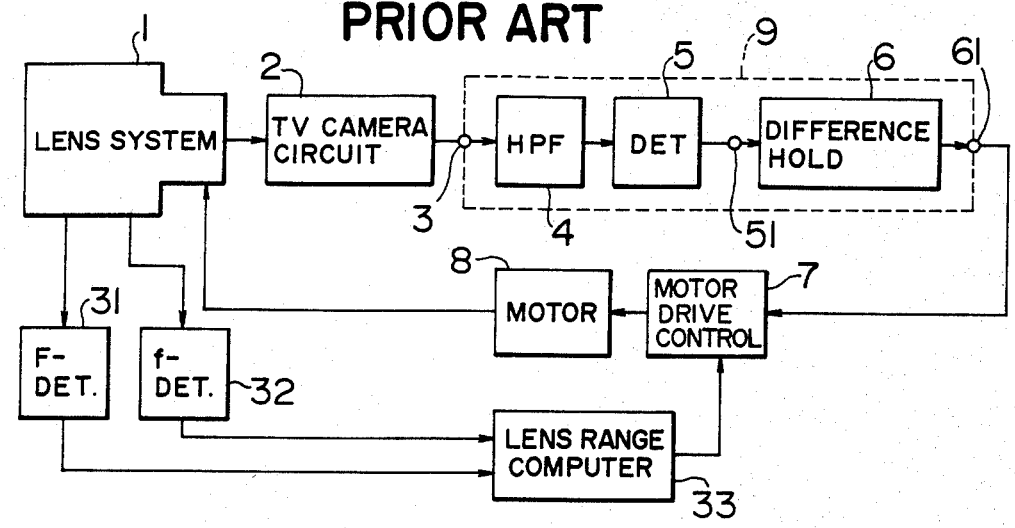
FIG. 1 is a block diagram showing the structure of a prior art automatic focusing system based upon the climbing control.
Figure 3:
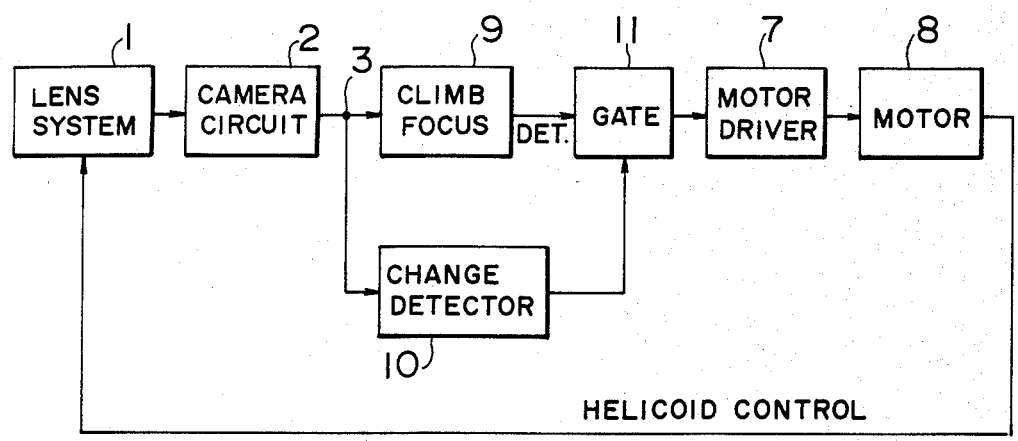
FIG. 3 is a block diagram showing the structure of an automatic focusing system provided with the function of an object change detection circuit, for illustrating the improvement according to the present invention.

In FIG. 3, blocks 1 to 9 are similar to those shown in FIG. 1. The automatic focusing system shown in FIG. 3 further includes an object change detection circuit 10 and a gate circuit 11.

In the absence of any object change, the output signal of a television camera circuit 2 is utilized, and a climbing or step-by-step control circuit 9 actuates a motor drive circuit 7 which drives a drive motor 8 thereby rotating the helicoid in a lens system 1 to achieve the step-by-step control operation. On the other hand, when an object change occurs, the object change detection circuit 10 detects such an object change in response to the output signal from the camera circuit 2, and the gate circuit 11 acts to disconnect the motor drive circuit 7 from the step-by-step control circuit 9 thereby interupting the step-by-step control operation. Thus, the tendency of failure of the step-by-step control due to an object change can be prevented. The cited patent application proposes a circuit structure as shown in FIG. 4 as one form of the object change detection circuit 10. Waveforms appearing at various parts of FIG. 4 are shown in FIG. 5.

Figure 4:
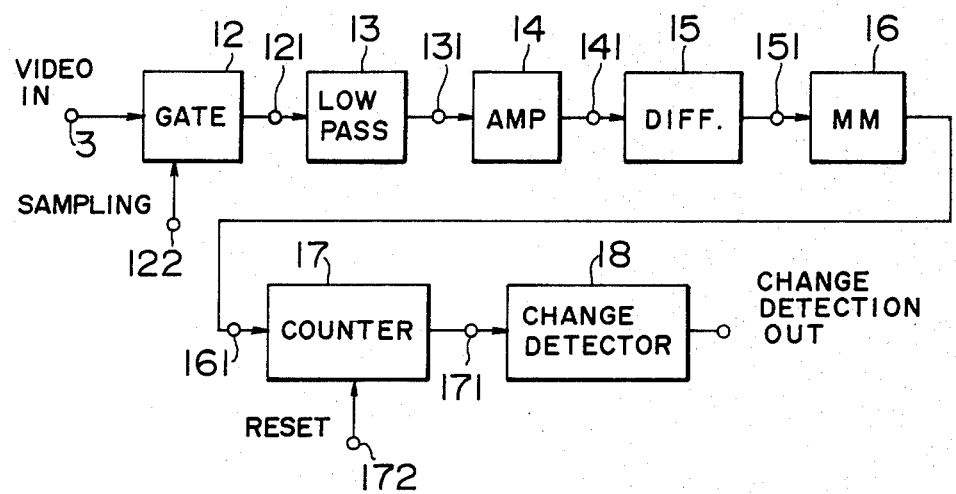
FIG. 4 is a block diagram showing the structure of the object change detection circuit shown in FIG. 3.
Figure 5:
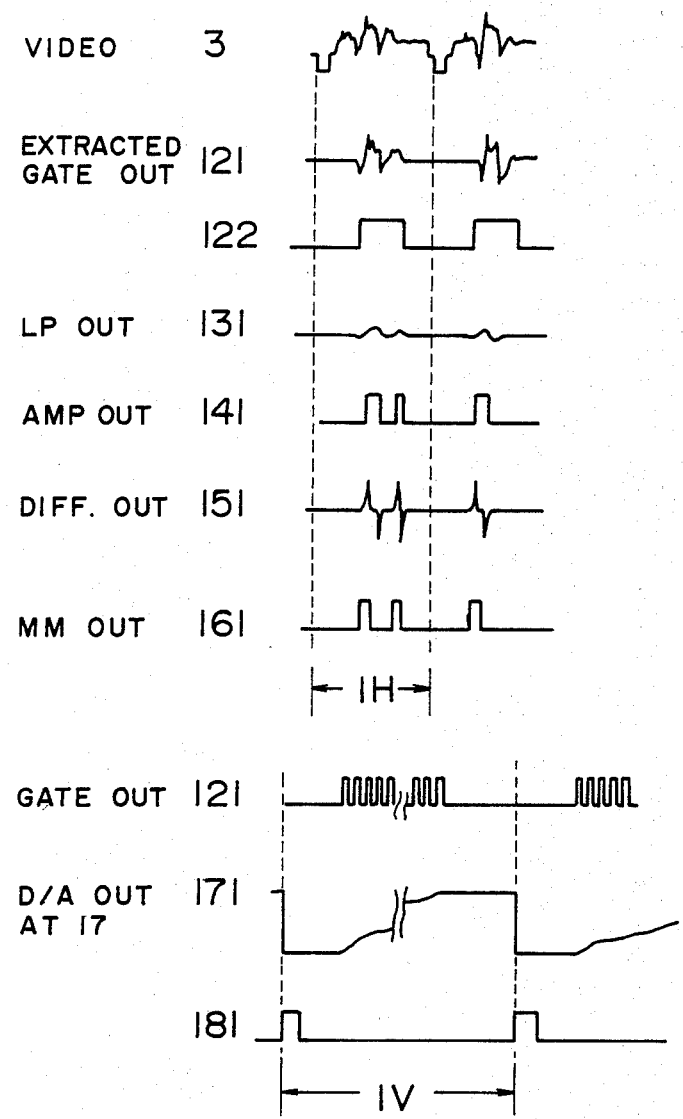
FIG. 5 is a waveform diagram showing waveforms appearing at various parts of FIG. 4.

Referring to FIG. 4, the proposed object change detection circuit 10 includes a picture extraction gate circuit 12, a low-pass filter (LPF) 13, an amplifier 14, a differentiator 15, a monostable multivibrator 16, a pulse counter or a low-pass filter 17 and a change detector 18.

A video signal 3 which is the output signal of the camera circuit 2 is applied from the camera circuit 2 to the picture extraction gate circuit 12. In the gate circuit 12, a signal portion corresponding to a specific portion of the screen, commonly, a signal portion corresponding to a quarter of the entire area of the central region of the screen is extracted in response to the application of a picture extracting gate signal 122 to the gate circuit 12, and such a signal 121 appears from the gate circuit 12 to be applied to the low-pass filter 13. The picture extraction gate circuit 12 and picture extracting gate signal 122 are disclosed in U.S. Ser. No. 390,643 filed June 21, 1982 by the present assignee (based on Japanese Patent Applications Nos. 98246/81 and 51250/82). This picture extraction gate circuit 12 is preferably disposed at the position corresponding to the position of the video signal used in the step-by-step control operation. The low-pass filter 13 has a cut-off frequency of several hundred KHz so that the output may not be adversely affected even when the camera may be rendered out of focus. The signal 121 applied to the low-pass filter 13 is rounded in its waveform after passing through the low-pass filter 13 and is then amplified by the amplifier 14 until it attains a predetermined grey level or is saturated relative to a threshold level which may be the mean level of the input signal. As a consequence, a pulse train 141 as shown in FIG. 5 appears from the amplifier 14. This pulse train 141 is then differentiated by the differentiator 15, and the output signal from the differentiator 15 is then converted by the monostable multivibrator 16 into a pulse train 161 of predetermined pulse width. The pulse counter 17 counts the number of pulses of the pulse train 161, and an analog output signal 171 as shown in FIG. 5 appears from the pulse counter 17 to be applied to the change detector 18. Thus, the analog output signal 171 from the pulse counter 17 is a voltage signal indicative of a change, if any, occurred in the picture being taken by the camera. A reset signal 172, which may be the vertical synchronizing signal of the camera, corresponding to the picture extracting gate signal 122 is applied to the pulse counter 17 to reset the pulse counter 17 at the end of each picture period, that is, upon completion of counting of the number of contours in one vertical period, so that the pulse counter 17 can respond to a momentary change occurred in the picture being taken by the camera. The presence of absence of an object change can be identified by the change detector 18 which detects such a change, if any, indicated by the analog output signal 171 from the pulse counter 17.

Figure 2:
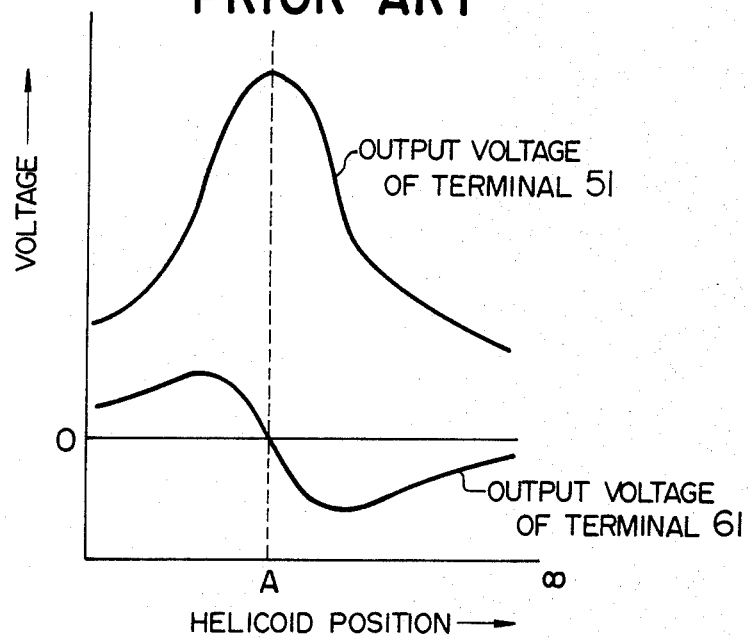
FIG. 2 is a waveform diagram illustrating the operation of the structure shown in FIG. 1.

As described above, in the object change detection circuit 10 having the structure shown in FIG. 4, the pulse counter 17 counts the number of contours detected for each picture, and the change detector 18 identifies the presence of an object change when it detects an abrupt change in the number of contours. Although the object change detection circuit 10 shown in FIG. 4 could considerably reduce the possibility of failure of the climbing or step-by-step control due to an object change, it has still a deficiency which will be described now. According to the structure shown in FIG. 4, a change in the number of contours resulting from a change in a picture being taken by the camera can only be identified with good fidelity in the vicinity of the focus point (in the vicinity of the apex of the focus voltage curve shown in FIG. 2), without being adversely affected by slight movement of the position of the lens system in the vicinity of the focus point. However, when the position of the lens system deviates greatly from the focus point due to some reason, the waveform of the video signal from the camera circuit taking the picture of the object will be completely rounded because of the fact that the low-pass filter characteristic of the lens system is quite low. (For example, the cut-off frequency is as low as about 20 kHz to 30 kHz.) In such a case, the number of contours detected for the picture of the object may not be counted with high fidelity or the count of the pulse counter may differ with movement of the position of the lens system, resulting in an erroneous count. In an extreme case, the pulse counter may not be utterly able to count the number of contours. Consequently, the change detector 18 may generate an object change indication signal due to movement of the position of the lens system even in the absence of any object change, thereby interrupting the step-by-step control on the lens system. The lens system may be stopped at a position of out-of-focus, resulting in impossibility of carrying out accurate focusing operation. Further, in the structure shown in FIG. 4, the circuits including the pulse circuit and linear circuit are required resulting in a considerably complex circuit structure.

Figure 6:
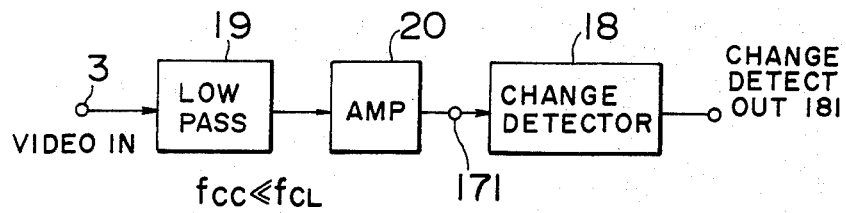
FIG. 6 is a block diagram showing the structure of an embodiment of the present invention.

FIG. 6 shows the structure of an embodiment of the present invention including one form of the improved object change detection circuit 10. In FIG. 6, the essential parts are merely shown for avoiding confusion, and other parts are similar to those shown in FIG. 3.

Referring to FIG. 6, the input terminal 3 of a video signal from the video camera circuit 2 is connected to a low-pass filter 19 whose cut-off frequency $f_{cc}$ is set to be quite lower than the cut-off frequency $f_{cL}$ (20 kHz to 30 kHz) of the lens system in the equivalent low-pass filter characteristic of the lens system when the lens system is brought to the most out-of-focus position. (For example, this cut-off frequency $f_{cc}$ is selected to be about 30 Hz to 100 Hz, and the relation $f_{cc} < f_{cL}$ holds). The low-pass filter 19 is connected through an amplifier 20 to a change detector 18 similar to that shown in FIG. 4.

Figure 7:
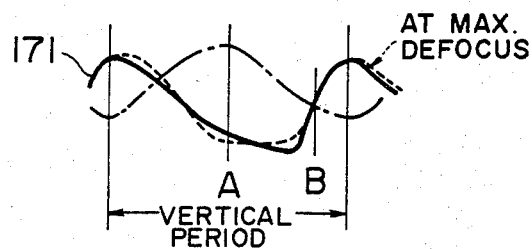
FIG. 7 is a waveform diagram illustrating the operation of the embodiment of the present invention shown in FIG. 6.

When now a video signal from the video camera circuit 2 taking the picture of an object is applied to the video signal input terminal 3 and is then passed through the low-pass filter 19, and the output signal of the low-pass filter 19 is amplified by the amplifier 20, a signal waveform as shown by the solid curve in FIG. 7 appears at the output terminal 171 of the amplifier 20. Since this signal waveform is obtained by passing the video signal through the low-pass filter 19 whose cut-off frequency $f_{cc}$ is set to be quite lower than the cut-off frequency $f_{cL}$ of the lens system in the equivalent low-pass filter characteristic of the lens system when the lens system is brought to the most out-of-focus position as described above, the signal waveform changes very slightly, and such a change is almost negligible as shown by the broken curve in FIG. 7 even when the lens system 1 is moved from the focus position to the most out-of-focus position. On the other hand, when the object itself, that is, the picture itself changes, it results in a change in not only the low-frequency component (the luminance and tone component) but also the high-frequency component of the frequency spectrum of the picture. Therefore, even when the low-frequency component only is extracted and the high-frequency component is cut off, the waveform of the output signal of the amplifier 20 changes greatly as shown by the one-dot chain curve in FIG. 7. That is, a great level change due to the object change occurs in the signal waveform appearing at the terminal 171, and the change detector 18 detects such a great level change and generates its output signal 181 indicative of such a level change. (For example, the change detector 18 detects such a level change at timing A for each picture.) A level change resulting from continuous movement of the object is not detected since the level does not exceed the threshold level. Even if such a level change due to movement of the object is detected, re-starting of the system for re-focusing can easily eliminate the unnaturalness of the picture.

Figure 8:
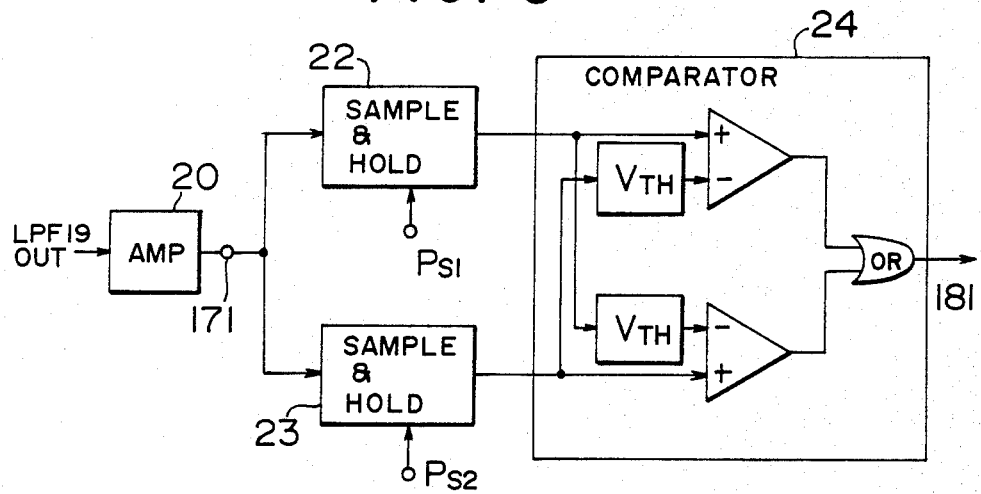
FIG. 8 is a block diagram showing in further detail the structure of one form of the change detection circuit in the embodiment shown in FIG. 6.

FIG. 8 shows in detail the structure of one form of the change detector 18 shown in FIG. 6, and FIGS. 9A and 9B are waveform diagrams illustrating the operation of the change detector 18. Referring to FIG. 8, the output signal of the low-pass filter 19 after passing through the amplifier 20 is applied to a pair of sample and hold circuits 22 and 23 which sample the input signal in response to the application of sampling pulse signals $P_{S1}$ and $P_{S2}$ having phases different from each other by one field period $T_{F1}$ (one vertical period) and each having a pulse period equal to the two-field period $T_{F2}$ respectively and hold the results of sampling. The output signals from the two sample and hold circuits 22 and 23 are applied to a voltage comparator circuit 24 which compares the input voltages. More precisely, the voltage comparator circuit 24 compares two consecutive fields with each other. This voltage comparator circuit 24 includes a pair of operational amplifiers each of which is connected at its plus input terminal to the associated one of the circuits 22 and 23, a pair of threshold circuits overlapping a reference d.c. voltage $V_{TH}$ on the input and applying the resultant voltage to the minus input terminals of the operational amplifiers respectively, and an OR gate connected to the output terminals of the operational amplifiers. A pulse voltage appears at the output terminal of the voltage comparator circuit 24 for a period of time $T_P$ in which the difference between the two input voltages exceeds a predetermined value, or for a predetermined period of time after the difference between the two input voltages has exceeded the predetermined setting. This pulse voltage provides the signal 181 indicative of the object change. Thus, the change detector 18 having the structure shown in FIG. 8 can detect a level change between the picture signals of two consecutive fields (two vertical periods).

The function of the change detector 18 will be described in further detail with reference to FIGS. 9A and 9B. Suppose now that a still picture a changes to a picture b due to an object change or panning of the video camera. Then, a signal $V_L$ as shown in FIG. 9A appears from the amplifier 20 which amplifies the output signal of the low-pass filter 19. This signal $V_L$ is applied to the sample and hold circuits 22 and 23 to be sampled and held. Consequently, a voltage signal $V_2$ as shown by the chain line appears at the output terminal of the sample and hold circuit 23, and a voltage signal $V_1$ as shown by the solid line appears at the output terminal of the sample and hold circuit 22.

FIG. 9B shows the difference between these two voltages $V_1$ and $V_2$. When the difference voltage exceeds the predetermined threshold voltage $V_H$, the voltage comparator circuit 24 generates the pulse signal during a period of time in which the voltage difference exceeds the voltage $V_{TH}$ or for a predetermined period of time after the voltage difference has exceeded the voltage $V_{TH}$. The threshold voltage $V_{TH}$ is so selected that the voltage comparator circuit 24 may not respond to a minute voltage attributable to, for example, a voltage drift in the circuit. The threshold circuits providing the threshold voltage $V_{TH}$ exhibit also the function of noise rejection.

FIG. 10 shows the structure of another embodiment of the automatic focusing system according to the present invention. The embodiment shown in FIG. 10 is an improvement of the embodiment shown in FIG. 6. In FIG. 7, the change detector 18 shown in FIG. 6 detects a level change due to a picture change at a timing A. However, depending on the contents of a picture, a level change as shown at a timing B may also occur at the timing A although the frequency of occurrence of such a level change may be low. In such a case, the change detector 18 shown in FIG. 6 is unable to detect the object change. Referring to the improved object change detection circuit 10 shown in FIG. 10, the waveform appearing at the terminal 171 shown by 171 in FIG. 7 is applied to an integrator circuit 21 to be subjected to full-wave rectification and smoothing. A reset signal is applied to a reset input terminal 172 of the integrator circuit 21 at the end of each field picture period (the vertical period) to reset the integrator circuit 21, so that a d.c. voltage provided by conversion of the analog waveform appears at its output terminal 173. Thus, when an object change occurs in one field, and the resultant d.c. voltage signal appears at the terminal 173, the change detector 18 detects the level change of the d.c. voltage to generate the signal 181 indicative of the object change. FIG. 11 shows voltage waveforms $V_1$ and $V_2$ appearing at the terminal 173. Such voltage waveforms are obtained by rectifying and smoothing the waveforms shown in FIG. 7 respectively and resetting the integrator circuit 21 at the end of each vertical period. In FIG. 11, the voltage $V_1$ has two levels as indicated by the solid line and broken line respectively as a result of movement of the lens system. However, it will be seen in FIG. 11 that there is not any appreciable level change therebetween, as also described already with reference to FIG. 7 which has been referred to for illustrating the operation of the first form of the object change detection circuit 10. Therefore, the level change due to movement of the lens system is negligible. On the other hand, a picture change results in a corresponding level change as shown by the one-dot chain line $V_2$ in FIG. 11. This level $V_2$ is constant throughout one vertical period (corresponding to one field picture) except the resetting period. Therefore, the insufficiency of the performance of the first form of the object change detection circuit 10 based on the spot contrast comparison is further improved.

It will be seen from the above description that, according to the object change detection circuit of various forms employed in the present invention, an erroneous signal resulting from movement of the lens system is never generated, and a signal indicative of an object change only can be reliably generated. By utilizing such an object change indication signal for interrupting and/or re-starting the step-by-step control operation, failure of proper step-by-step control due to an object change can be satisfactorily reliably prevented. The object change detection circuit according to the present invention is advantageous over the prior art circuit designed for counting the number of contours of pictures in that its structure is quite simple.

Figure 12:
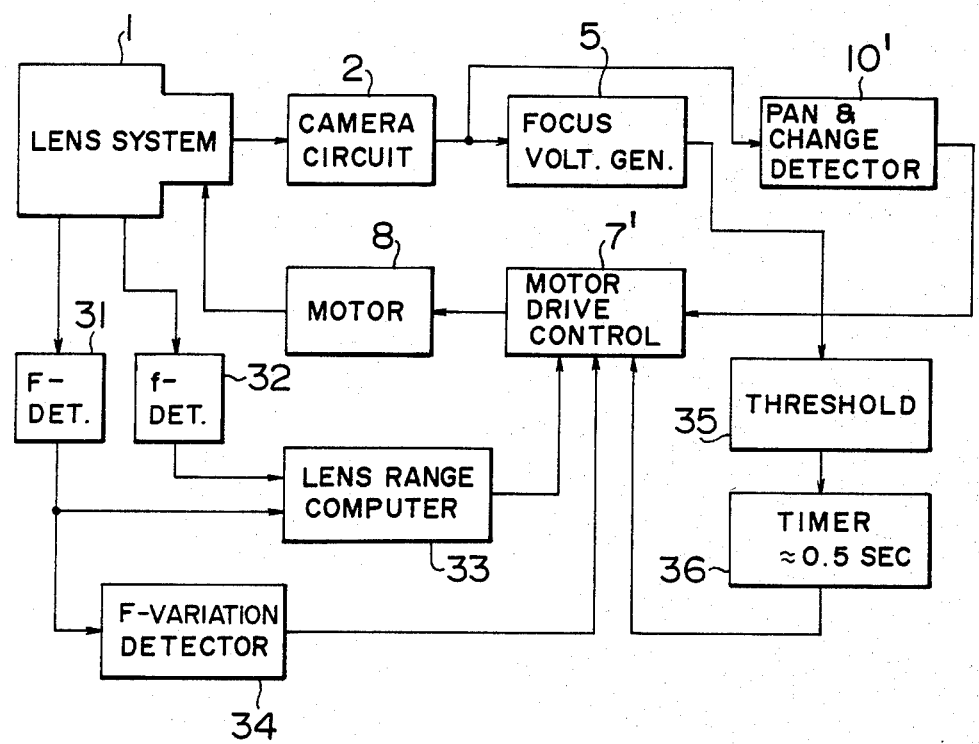
FIG. 12 is a block diagram showing the structure of still another embodiment of the present invention.

FIG. 12 shows still another embodiment of the automatic focusing system according to the present invention.

In FIG. 12, the same reference numerals are used to designate the same or equivalent parts appearing in FIG. 1 to indicate that such parts function in the same way. For example, the structure and function of the reduction factor (F) detector 31 and zoom factor (f) detector 32 are similar to those disclosed in U.S. Pat. No. 4,320,417 cited already.

Referring to FIG. 12, the output signal of the reduction factor detector 31 is applied to the lens range computing circuit 33 and also to a reduction-factor change detection circuit 34. When there occurs a change in the contents of a picture due to an object change, panning of the video camera or crossing of a moving body directly in front of the lens system 1, the output voltage F of the reduction factor detector 31 changes correspondingly. When the reduction-factor change detection circuit 34 detects that the level change of the output voltage F of the reduction factor detector 31 is more than a predetermined threshold level $V_{TH}$ during a predetermined period of time of, for example, 0.27 sec, it applies a motor deenergizing signal to a motor drive control circuit 7′ which has both of the function of the gate circuit 11 and the function of the motor drive circuit 7. On the other hand, when the reduction-factor change detection circuit 34 detects that the level change during the predetermined period of time e.g. 0.27 sec. is less than the predetermined threshold level $V_{TH}$ or less than, for example, 3%, it decides that the reduction factor F is stable, that is, the status of the object is stable, and applies a motor re-starting signal to the motor drive control circuit 7′ so that the normal or usual step-by-step control operation can proceed or re-start.

As described above, as long as the reduction-factor change detection circuit 34 detects a level change of the reduction factor voltage equal to or more than the predetermined threshold level $V_{TH}$ during the predetermined period it applies a motor stopping signal to the motor drive control circuit 7′ to stop the motor and then re-start it as soon as the object change disappears, thus resulting in a good automatic focusing operation. The motor drive control circuit 7′ may also have functions of the motor drive circuit 7 and the gate circuit 11. This reduction-factor change detection circuit 34 may have a structure similar to, for example, the combination of the sample and hold circuits 22, 23 and the comparator circuit 24 shown in FIG. 8. The reduction factor indication signal from the reduction factor detector 31 may be applied to the sample and hold circuits.

The focus voltage generated from the focus voltage generating circuit 5 included in the step-by-step control circuit 9 is applied to a threshold circuit 35. The threshold voltage of this threshold circuits 35 is set at a predetermined level close to zero volts so as to eliminate noise. When a moving body such as a man crosses directly in front of the lens system 1 or covers the front face of the lens system 1 by his hand, the focus voltage undergoes zero volts for a moment. Therefore, the threshold circuit 35 detects at that moment that the focus voltage has dropped to a level lower than the threshold voltage level and energizes a timer 36. At the end of a period of time of, for example, 0.5 sec at which time the object picture taking condition is considered to be stabilized from the abnormal situation, the timer 36 applies a re-starting signal to the motor drive control circuit 7′ to re-start the motor 7 so that the normal or usual step-by-step control operation can be started again.

Besides the detector 34 and timer 36, a camera-panning and object-change detection circuit 10' similar to the object change detection circuit 10 shown in FIGS. 6 and 10 is provided so that the object change indication signal can be applied to the motor drive control circuit 7'. Similarly to the cases of the other object change detection signals, the motor may be interrupted or stopped during the detection signal occurring.

Figure 13:
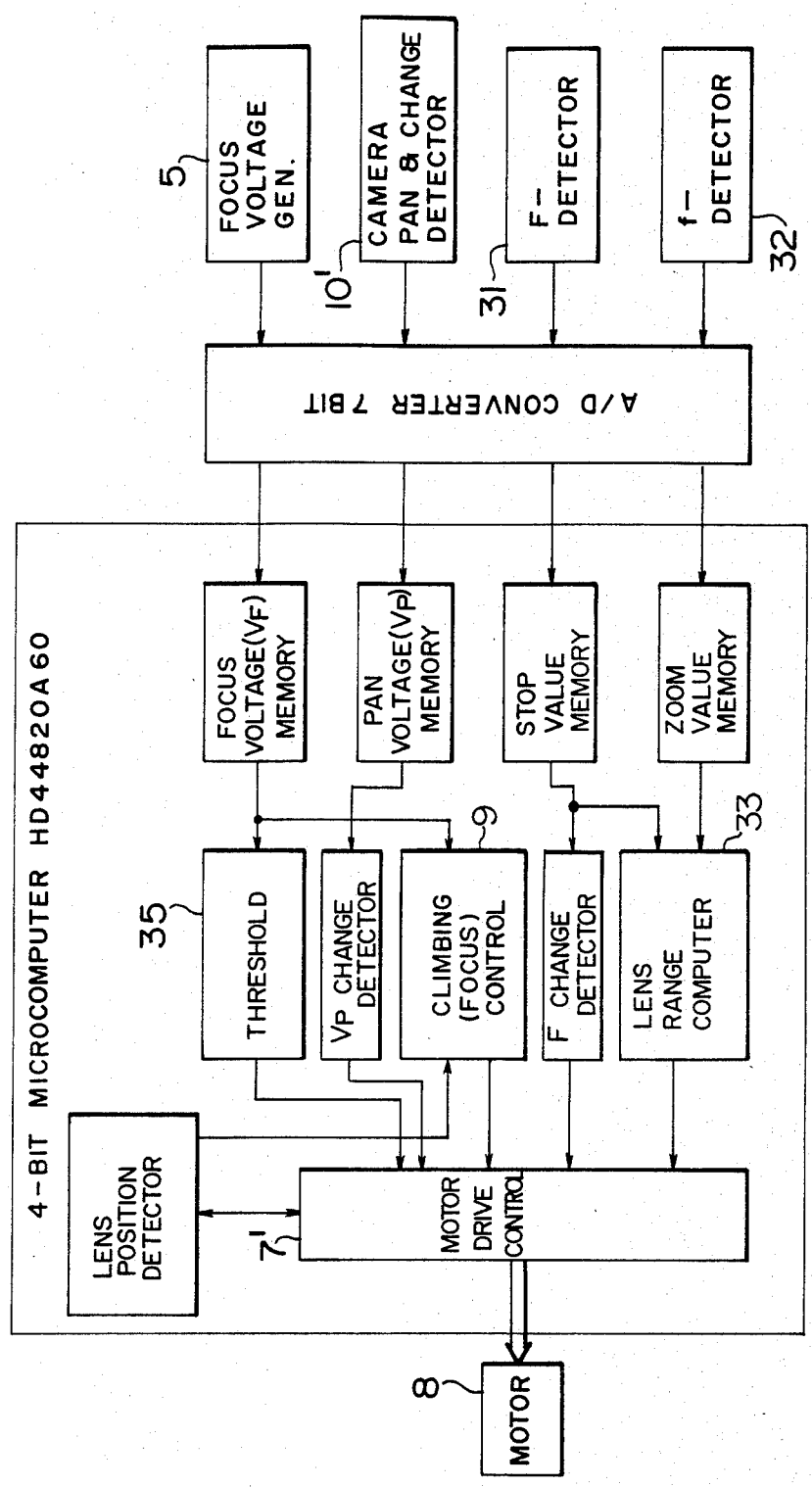
FIG. 13 is a block diagram showing in detail the structure of part of the embodiment of the present invention shown in FIG. 12.

The predetermined period of time during which the reduction-factor change detector 34 detects a level change of the output voltage F of the reduction factor detector 31 is, for example, 0.27 sec (i.e. the period of 16 fields) as described above, and the predetermined threshold level $V_{TH}$ corresponds to, for example, 1/32 of the maximum reduction factor. The reduction-factor change detector 34 differs from the afore-mentioned detector in including an A/D converter in its first stage. This A/D converter converts the analog output voltage F of the reduction factor detector 31 so that, when the detector output voltage F is, for example, 7 volts which is maximum, its digital value provides a binary signal of 7 bits ($2^7=128$) for providing the motor deenergization signal. When, on the other hand, the detector output voltage F is, for example, 3 volts, the motor re-starting signal is applied unless the A/D converted value of the detector output voltage F provides a binary signal of more than 3 bits ($2^3=8$) which lasts throughout the period of 16 fields. Such a circuit 34 can be readily conceived by those skilled in the art in both the aspect of hardware and the aspect of software, and any detailed description of its structure will be unnecessary. FIG. 13 shows an example in which a Hitachi's 4-bit microcomputer of model HD44820A60 is used to constitute part of the third embodiment of the automatic focusing system according to the present invention. How to operate this computer will be easily understood from reference to U.S. Ser. No. 377,438 filed May 12, 1982 and assigned to the present assignee.

It will be understood from the description of the third embodiment of the present invention that the possibility of mal-operation of the automatic focusing system due to a change of the focus voltage attributable to an object change, panning of the video camera or crossing of a moving body directly in front of the lens system can be greatly reduced. That is, the possibility of mal-operation such as shifting of the lens system to an out-of-focus position due to erroneous judgment of the focus voltage increase and decrease or unstable automatic focusing operation due to unnecessary movement of the lens system can be greatly reduced.

What is claimed is:

1. An automatic focusing system for a video camera comprising:
    (a) means for providing a focus signal on the basis of a video signal of an object being photographed by the video camera;
    (b) lens-system position control means including a motor for controlling the position of a lens system in response to said focus signal thereby bringing the lens system to a focus position;
    (c) picture-contents change detecting means for detecting a change of the contents of the picture of the object;
    (d) motor drive inhibiting means for inhibiting driving of said motor in response to the output signal of said picture-contents change detecting means thereby interrupting the focusing operation,
    (e) said picture-contents change detecting means including at least one of picture-contents change indication signal generating means including a low-pass filter having a low cut-off frequency and a level comparator for generating a signal indicative of a change of the picture contents by detecting a change of the level of the output signal of said low-pass filter through which the video signal from the object is passed, reduction-factor change detecting means for generating such a picture-contents change indication signal on the basis of a change of the output voltage of a detector detecting the reduction factor of the video camera, and momentary change detecting means including a threshold circuit and a timer circuit for generating such a picture-contents change indication signal by detecting an abrupt change of the focusing signal generated from said focusing signal providing means.

2. An automatic focusing system as claimed in claim 1, wherein said filter included in said picture-contents change indication signal generating means has a cut-off frequency lower than the cut-off frequency of said lens system in the equivalent low-pass filter characteristic of said lens system when said lens system is brought to the most out-of-focus position.

3. An automatic focusing system as claimed in claim 2, wherein said picture-contents change indication signal generating means includes an integrator connected between said low-pass filter and said level comparator for integrating the output signal of said low-pass filter in each picture period, and the integrator output signal indicative of the result of integration in the present picture period and that indicative of the result of integration in the preceding picture period are applied as two inputs to be compared with each other in said level comparator.

4. An automatic focusing system as claimed in claim 2, wherein said level comparator includes a first sample and hold circuit sampling and holding the output signal of said low-pass filter generated in one picture period, a second sample and hold circuit sampling and holding the output signal of said low-pass filter generated in the succeeding picture period, at least one operational amplifier receiving the output signals of said first and second sample and hold circuits as two inputs to be compared with each other, and a threshold circuit connected in the preceding stage of one of the inputs to said operational amplifier, and the output signal of said operational amplifier is applied to said motor drive inhibiting means as said picture-contents change indication signal.

5. An automatic focusing system as claimed in claim 1, wherein said reduction-factor change detecting means includes a sample and hold circuit and a comparator circuit to detect a change between the values of the reduction factor detected in two consecutive picture periods, so as to actuate said motor drive inhibiting means when the detected change of the reduction factor is more than or equal to a predetermined setting and to release the inhibiting operation of said motor drive inhibiting means when the detected change of the reduction factor is less than the predetermined setting.

6. An automatic focusing system as claimed in claim 1, wherein said momentary change detecting means includes timer means for generating, in response to the output signal of said threshold circuit, a signal releasing the inhibiting operation of said motor drive inhibiting means after a predetermined period of time, thereby re-starting said motor.

7. An automatic focusing system as claimed in claim 1, wherein said motor drive inhibiting means includes a gate circuit receiving said picture-contents change indication signal as its gate control signal and acts to disconnectably connect between a step-by-step control circuit included in said focus signal providing means and a motor drive circuit included in said lens-system position control means.

8. An automatic focusing system for a video camera comprising means for providing a focus signal on the basis of a video signal of an object being photographed by the video camera, lens-system position control means including a motor for controlling the position of a lens system in response to said focus signal thereby bringing said lens system to a focus position, object change detecting means for detecting an object change on the basis of the video signal, and motor drive inhibiting and/or re-starting means actuated to interrupt the operation of said motor thereby interrupting and/or re-starting the focusing operation when an object change is detected by said object change detecting means, said object change detecting means including a low-pass filter which has a cut-off frequency lower than the cut-off frequency of said lens system in the equivalent low-pass filter characteristic of said lens system when said lens system is brought to the most out-of-focus position and to which the video signal is applied, and object change identifying means for identifying the occurrence of an object change by comparing the output signal applied from said low-pass filter in one picture period with that applied in the preceding picture period.

9. An automatic focusing system as claimed in claim 8, wherein said object change detecting means includes means for periodically converting the output signal of said low-pass filter into a d.c. voltage which is applied to said object change identifying means.

10. An automatic focusing system for a video camera comprising means for extracting a focus voltage on the basis of a high-frequency component of a video signal of an object being photographed by the video camera thereby judging whether the focus voltage is increasing or decreasing, and a motor driving a focusing mechanism of a lens system until the focus voltage becomes maximum thereby attaining automatic focusing, said system further comprising means operative in response to a signal indicative of the reduction factor applied from reduction factor detecting means to generate a signal for interrupting the operation of said motor while a predetermined change of the reduction factor is occurring within a predetermined period of time and to generate a signal for re-starting said motor when the change of the reduction factor is reduced to less than said predetermined setting within said predetermined period of time thereby restoring the normal automatic focusing operation.

11. An automatic focusing system as claimed in claim 10, further comprising a threshold circuit for detecting an abrupt change of the focus voltage and timer means for re-starting said motor at least once in a predetermined period of time after the abrupt change of the focus voltage is detected.

12. An automatic focusing system for a video camera comprising:
  (a) means for providing a focus signal on the basis of a video signal of an object being photographed by the video camera;
  (b) lens-system position control means including a motor for controlling the position of a lens system in response to said focus signal thereby bringing the lens system to a focus position;
  (c) picture-contents change detecting means for detecting a change of the contents of the picture of the object;
  (d) motor drive control means for controlling driving of said motor in response to the output signal of said picture-contents change detecting means thereby permitting re-starting of the focusing operation,
  (e) said picture-contents change detecting means including at least one of picture-contents change indication signal generating means including a low-pass filter having a low cut-off frequency and a level comparator for generating a signal indicative of a change of the picture contents by detecting a change of the level of the output signal of said low-pass filter through which the video signal from the object is passed, reduction-factor change detecting means for generating such a picture-contents change indication signal on the basis of a change of the output voltage of a detector detecting the reduction factor of the video camera, and momentary change detecting means including a threshold circuit and a timer circuit for generating such a picture-contents change indication signal by detecting an abrupt change of the focusing signal generated from said focusing signal providing means.

13. An automatic focusing system as claimed in claim 12, wherein said picture-contents change detecting means includes said picture-contents change indication signal generating means and said reduction-factor change detecting means.

14. An automatic focusing system as claimed in claim 12, wherein said picture-contents change detecting means includes said picture-contents change indication signal generating means and said momentary change detecting means.

15. An automatic focusing system as claimed in claim 12, wherein said picture-contents change detecting means includes said reduction-factor change detecting means and said momentary change detecting means.

16. An automatic focusing system as claimed in claim 12, wherein said picture-contents change detecting means includes said picture-contents change indication signal generating means, said reduction-factor change detecting means, and said momentary change detecting means.

* * * * *